(Model.)
M. CHRISTLMILLER.
IMPLEMENT FOR BLEEDING TREES.
No. 253,185. Patented Feb. 7, 1882.
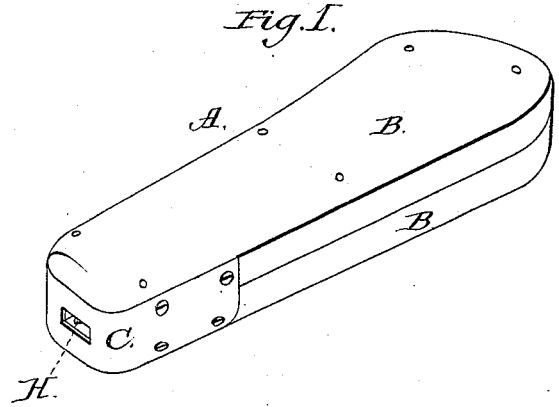
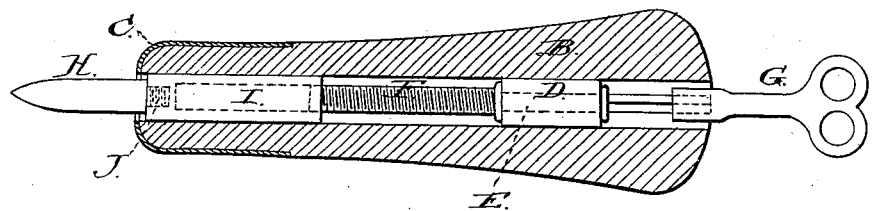
WITNESSES
John A. Ellis
A. A. Hughes
INVENTOR
Mathias Christlmiller
Theodor Mungen,
his ATTORNEY

UNITED STATES PATENT OFFICE.

MATHIAS CHRISTLMILLER, OF WASHINGTON, DISTRICT OF COLUMBIA.

IMPLEMENT FOR BLEEDING TREES.

SPECIFICATION forming part of Letters Patent No. 253,185, dated February 7, 1882.

Application filed December 19, 1881. (Model.)

*To all whom it may concern:*

Be it known that I, MATHIAS CHRISTLMILLER, a citizen of the United States, residing at Washington, in the county of Washington and District of Columbia, have invented certain new and useful Improvements in Implements for Bleeding Trees, of which the following is a specification, reference being had therein to the accompanying drawings, in which—

Figure 1 is a representation of a perspective of my device, and Fig. 2 is a sectional view thereof.

This invention has relation to implements for bleeding trees to promote their growth; and it consists in the novel construction and arrangement of parts, as will be hereinafter fully described, and particularly pointed out in the claim.

Heretofore trees have been bled by making elongated vertical slits in the bark of the same by the use of a knife in the hand of the operator; but great care and skill were required to prevent cutting entirely through the bark of the tree to the wood, for the reason that the growth of the trees varies, and young trees of the same species have thinner bark than those of an older growth, so that experienced persons only could safely undertake to bleed the trees. My object is to overcome this difficulty and to produce an implement, which may be set to cut any desired depth required in bleeding trees of various growths, and also to permit any unskilled person under the direction of a skilled one to bleed the trees at the proper time as successfully as a skilled person could do.

Referring by letter to the accompanying drawings, A designates the incasement, consisting of the parts B B, riveted or otherwise secured together to protect the operative parts of the mechanism, and serve as a handle when using the implement. This handle may be made of wood, gutta-percha, bone, or other suitable material, and is faced at its point with a slotted metallic guard, C, to protect the material of which the handle is composed, and which, when worn out by use, may be replaced, thus prolonging the usefulness of the handle. Near the butt of the handle and within the recess formed by the union of the parts B B is secured a stationary sleeve, D, in which the smooth portion of a shaft, E, provided with an endless screw-threaded portion, F, is seated. The rear end of this shaft E is made rectangular to receive a key, G, by which to set the blade H. The threaded sleeve I engages the screw portion F within the handle, and the blade H has a threaded tang, J, which is screwed into the head of the sleeve I, so that when the shaft E is turned in one direction the blade H will be caused to project through the slot in the slotted guard C to any required distance, and when the shaft E is turned in the opposite direction the blade will be caused to recede within the handle. The utility of the invention is obvious.

Having thus fully described my invention, what I claim as new, and desire to secure by Letters Patent of the United States, is—

In an implement for bleeding trees, the combination, with the two-part handle having the slotted metallic guard at its point, of the threaded shaft having the key-post, and the sleeve I, having the removable blade and the stationary sleeve within which the shaft works, substantially as specified.

In testimony whereof I affix my signature in presence of two witnesses.

MATHIAS CHRISTLMILLER.

Witnesses:
 THEO. MUNGEN,
 HERMANN SCHMIDT.